(12) United States Patent
Lee et al.

(10) Patent No.: US 8,897,196 B2
(45) Date of Patent: Nov. 25, 2014

(54) METHOD AND APPARATUS FOR TRANSMITTING AND RECEIVING CONTROL INFORMATION IN WIRELESS COMMUNICATION SYSTEM

(75) Inventors: Young Dae Lee, Anyang-si (KR); Seung June Yi, Anyang-si (KR); Sung Hoon Jung, Anyang-si (KR); Sung Duck Chun, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 214 days.

(21) Appl. No.: 13/511,088

(22) PCT Filed: Jan. 6, 2011

(86) PCT No.: PCT/KR2011/000068
§ 371 (c)(1),
(2), (4) Date: May 21, 2012

(87) PCT Pub. No.: WO2011/083977
PCT Pub. Date: Jul. 14, 2011

(65) Prior Publication Data
US 2012/0300689 A1    Nov. 29, 2012

(30) Foreign Application Priority Data

Jan. 5, 2011  (KR) .................. 10-2011-0000979

(51) Int. Cl.
*H04H 20/71*   (2008.01)
*H04L 5/00*    (2006.01)
*H04L 29/06*   (2006.01)
*H04W 72/12*   (2009.01)
*H04W 24/10*   (2009.01)
*H04W 72/00*   (2009.01)

(52) U.S. Cl.
CPC ............. *H04W 24/10* (2013.01); *H04L 5/0094* (2013.01); *H04L 69/28* (2013.01); *H04L 5/0053* (2013.01); *H04W 72/12* (2013.01); *H04L 5/0048* (2013.01); *H04W 72/005* (2013.01)
USPC ............................ 370/312; 370/329; 370/336

(58) Field of Classification Search
None
See application file for complete search history.

(56) References Cited

U.S. PATENT DOCUMENTS

| | | | |
|---|---|---|---|
| 2005/0213583 A1* | 9/2005 | Lee et al. ................... | 370/395.5 |
| 2005/0249140 A1 | 11/2005 | Lee et al. | |
| 2005/0249141 A1 | 11/2005 | Lee et al. | |
| 2006/0034205 A1 | 2/2006 | Kim | |
| 2006/0056347 A1* | 3/2006 | Kwak et al. ................... | 370/329 |
| 2009/0046617 A1* | 2/2009 | Tenny et al. ................... | 370/312 |
| 2009/0129375 A1* | 5/2009 | Mohanty et al. .............. | 370/356 |
| 2010/0189026 A1* | 7/2010 | Lee et al. ...................... | 370/312 |
| 2010/0272004 A1* | 10/2010 | Maeda et al. ................. | 370/312 |
| 2011/0013515 A1* | 1/2011 | Lecompte ..................... | 370/235 |

* cited by examiner

*Primary Examiner* — Anh-Vu Ly
*Assistant Examiner* — Hashim Bhatti
(74) *Attorney, Agent, or Firm* — Birch, Stewart, Kolasch & Birch, LLP

(57) ABSTRACT

A method and apparatus for transmitting and receiving control information in a wireless communication system are provided. In a method for receiving control information of a plurality of multiplexed channels by a User Equipment (UE) in a wireless communication system, the UE receives first control information including a first field indicating a specific identifier from a base station, wherein the plurality of multiplexed channels are not transmitted during a specific time interval based on the specific identifier.

13 Claims, 4 Drawing Sheets

Sub-frame

▨ Symbols transmitting a PDCCH (L/L2 control channel)

| Identifier 1 | Time Region 1 | Oct 1 |
| Time Region 1 | | Oct 2 |
| Identifier 2 | Time Region 2 | Oct 3 |
| Time Region 2 | | Oct 4 |
| Identifier 3 | Time Region 3 | Oct 5 |
| Time Region 3 | | Oct 6 |

...

| Identifier n | Time Region n | Oct 2n-1 |
| Time Region n | | Oct 2n |

METHOD AND APPARATUS FOR TRANSMITTING AND RECEIVING CONTROL INFORMATION IN WIRELESS COMMUNICATION SYSTEM

CROSS REFERENCE TO RELATED APPLICATIONS

This application is the National Phase of PCT/KR2011/000068 filed on Jan. 6, 2011, which claims priority under 35 U.S.C. §119(e) to U.S. Provisional Application No. 61/293,185 filed on Jan. 7, 2010 and under 35 U.S.C. §119(a) to Patent Application No. 10-2011-0000979 filed in the Republic of Korea on Jan. 5, 2011, all of which are hereby expressly incorporated by reference into the present application.

TECHNICAL FIELD

The present invention relates to a wireless communication system, and more particularly, to a method and apparatus for transmitting and receiving control information in a wireless communication system.

BACKGROUND ART

First, an Evolved Universal Terrestrial Radio Access Network (E-UTRAN) system is described below with reference to FIG. 1.

FIG. 1 illustrates a network structure of the E-UTRAN. The E-UTRAN system has evolved from the conventional UTRAN and basic standardization thereof is currently underway under the 3rd Generation Partnership Project (3GPP). The E-UTRAN system is also referred to as a "Long Term Evolution (LTE) system".

The E-UTRAN includes eNode Bs (eNBs). The eNBs are connected through X2 interfaces. Each eNB is connected to User Equipments (UEs) and is connected to an Evolved Packet Core (EPC) through an S1 interface.

Radio interface protocol layers between UEs and the network can be divided into a first layer (L1), a second layer (L2), and a third layer (L3) based on the lower three layers of the Open System Interconnection (OSI) reference model widely known in the field of communication. A physical layer included in the first layer provides an information transfer service using a physical channel. A Radio Resource Control (RRC) layer located at the third layer controls radio resources between UEs and the network. To accomplish this, the RRC layer exchanges RRC messages between UEs and the network.

FIG. 2 illustrates a radio interface protocol structure between a UE and a UTRAN based on the 3GPP radio access network standard. The radio interface protocol of FIG. 2 is divided horizontally into a physical layer, a data link layer, and a network layer and is divided vertically into a user plane for data/information transmission and a control plane for signaling. The protocol layers of FIG. 2 can be divided into a first layer (L1), a second layer (L2), and a third layer (L3) based on the lower three layers of the Open System Interconnection (OSI) reference model widely known in the field of communication.

A physical layer, which is the first layer, provides an information transfer service to an upper layer using a physical channel. The physical layer is connected to a Medium Access Control (MAC) layer above the physical layer through a transport channel. Data is transferred between the MAC layer and the physical layer through the transport channel. Data transfer between different physical layers, specifically between the respective physical layers of transmitting and receiving ends, is performed through the physical channel. The physical channel is modulated according to Orthogonal Frequency Division Multiplexing (OFDM) method, using time and frequency as radio resources.

The MAC layer of the second layer provides a service to a Radio Link Control (RLC) layer above the MAC layer through a logical channel. The MAC layer may construct a MAC Protocol Data Unit (PDU) by attaching a MAC header to Service Data Units (SDUs) of an upper layer. The MAC PDU may include MAC Control Elements (CEs) which are control messages that can control functions of the MAC layer.

The RLC layer of the second layer supports reliable data transfer. A PDCP layer of the second layer performs a header compression function to reduce the size of each IP packet header containing relatively large, unnecessary control information in order to efficiently transmit IP packets such as IPv4 or IPv6 packets in a radio interval with a small bandwidth.

FIG. 3 illustrates an exemplary configuration of a MAC PDU in the related art. As shown in FIG. 3, the MAC PDU is divided into a MAC header and a MAC payload. The MAC payload may include zero or one or more MAC CEs and zero or one or more MAC SDUs. The MAC header includes one or more MAC sub-headers for the MAC CEs and the MAC SDUs included in the payload.

The Radio Resource Control (RRC) layer located at the top of the third layer is defined only in the control plane and is responsible for control of logical, transport, and physical channels in association with configuration, re-configuration, and release of radio bearers (RBs). The RB is a service that the second layer provides for data communication between the UE and the UTRAN. The UE is in a connected mode if there is an RRC connection between the RRC layer of the radio network and the RRC layer of the UE. Otherwise, the UE is in an RRC idle mode.

A Non-Access Stratum (NAS) layer located above the RRC layer performs functions such as session management and mobility management.

One cell included in the eNB is set to provide a bandwidth such as 1.25, 2.5, 5, 10, or 20 MHz to provide a downlink or uplink transmission service to a plurality of UEs. Here, different cells may be set to provide different bandwidths.

Downlink channels used to transmit data from the network to the UE include a Broadcast Channel (BCH) used to transmit system information, a Paging Channel (PCH) used to transmit paging messages, and a downlink Shared Channel (SCH) used to transmit user traffic or control messages. Control messages or traffic of a downlink multicast or broadcast service (Multimedia Broadcast/Multicast Service (MBMS)) is transmitted through a downlink multicast channel (MCH). Uplink channels used to transmit data from the UE to the network include a Random Access Channel (RACH) used to transmit initial control messages and an uplink SCH used to transmit user traffic or control messages.

A logical channel is located above the transport channel and is mapped to the transport channel. The logical channel is mainly classified into a control logical channel and a traffic logical channel.

FIG. 4 illustrates conventional control channel transmission.

The physical channel includes a number of subframes in the time domain and a number of subcarriers in the frequency domain. One subframe includes a plurality of resource blocks, each of which includes a plurality of symbols and a plurality of subcarriers. In each subframe, specific subcarriers of specific symbols (for example, the first symbol) of the subframe can be used for a Physical Downlink Control Channel (PDCCH), i.e., an L1/L2 control channel, as shown in FIG. 4. One subframe corresponds to 0.5 ms and a Transmission Time Interval (TTI), which is a unit data transmission time, is 1 ms corresponding to two subframes.

A Multicast Control Channel (MCCH), which is a logical channel, or a Multicast Traffic Channel (MTCH) may be mapped to an MCH which is a transport channel for MBMS. The MCCH transmits an MBMS related RRC message and the MTCH transmits traffic of a specific MBMS service.

In the LTE system, MBMS data is transmitted through MBMS-dedicated Multimedia Broadcast multicast service Single Frequency Network (MBSFN) subframes.

One or more MTCHs mapped to one MCH are scheduled to MBSFN subframes at regular intervals. Scheduling information of one or more MTCHs mapped to one MCH is broadcast to UEs through MCH Scheduling Information (MSI) which is a MAC Control Element (MAC CE). The MSI is also referred to as "MBMS Dynamic Scheduling Information (DSI). Here, an MSI MAC CE for a specific MCH is updated at regular intervals through MBSFN subframes allocated to the specific MCH.

In the related art, MBSFN subframes scheduled through the MSI are always used only for transmission of the corresponding MTCH. That is, once MBSFN subframes are allocated for transmission of a specific MTCH, the allocated MBSFN subframes cannot be used for purposes other than MBMS during a corresponding MSI transmission period. Thus, in the case where various data rates are supported for a specific MBMS, some of the allocated MBSFN subframes may not be utilized during a specific time period, resulting in inefficient use of wireless resources.

DISCLOSURE OF INVENTION

Technical Problem

As described above, the related art has a problem in that wireless resources are not efficiently used since MBSFN subframes scheduled through MSI are always used only for transmission of the corresponding MTCH.

An object of the present invention devised to solve the problem lies on providing a method and apparatus for transmitting and receiving control information, which can efficiently use wireless resources.

Objects of the present invention are not limited to those described above and other objects will be clearly understood by those skilled in the art from the following description.

Solution to Problem

The object of the present invention can be achieved by providing a method for receiving control information of a plurality of multiplexed channels by a User Equipment (UE) in a wireless communication system, the method including receiving first control information including a first field indicating a specific identifier from a base station, wherein the plurality of multiplexed channels are not transmitted during a specific time interval based on the specific identifier.

Here, the UE may receive a channel other than the plurality of channels from the base station during the specific time interval.

The channel other than the plurality of channels may be a Dedicated Traffic Channel (DTCH) or a Dedicated Control Channel (DCCH).

The first control information further includes a second field indicating information on the specific time interval.

The information on the specific time interval may indicate a last time point of the specific time interval.

The first control information further includes a third field indicating a channel identifier identifying one of the plurality of channels.

The first control information further includes a fourth field indicating a time interval in which the one of the plurality of channels is transmitted.

The UE may receive second control information including information on the channel identifier and the specific identifier from the base station.

The plurality of channels may include Multicast Traffic Channels (MTCHs) which are multiplexed into one multicast channel.

The specific identifier may be a value that is not used among values of channel identifier fields for channel identifiers identifying the plurality of multiplexed channels.

In another aspect of the present invention, provided herein is a method for transmitting control information of a plurality of multiplexed channels by a base station in a wireless communication system, the method including transmitting first control information including a first field indicating a specific identifier, wherein the plurality of multiplexed channels is not transmitted during a specific time interval based on the specific identifier.

Advantageous Effects of Invention

According to the embodiments of the present invention, it is possible to efficiently use wireless resources by using a specific identifier indicating that a plurality of multiplexed channels is not transmitted.

Advantages of the present invention are not limited to those described above and other advantages will be clearly understood by those skilled in the art from the following description.

BRIEF DESCRIPTION OF DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Figure 1:
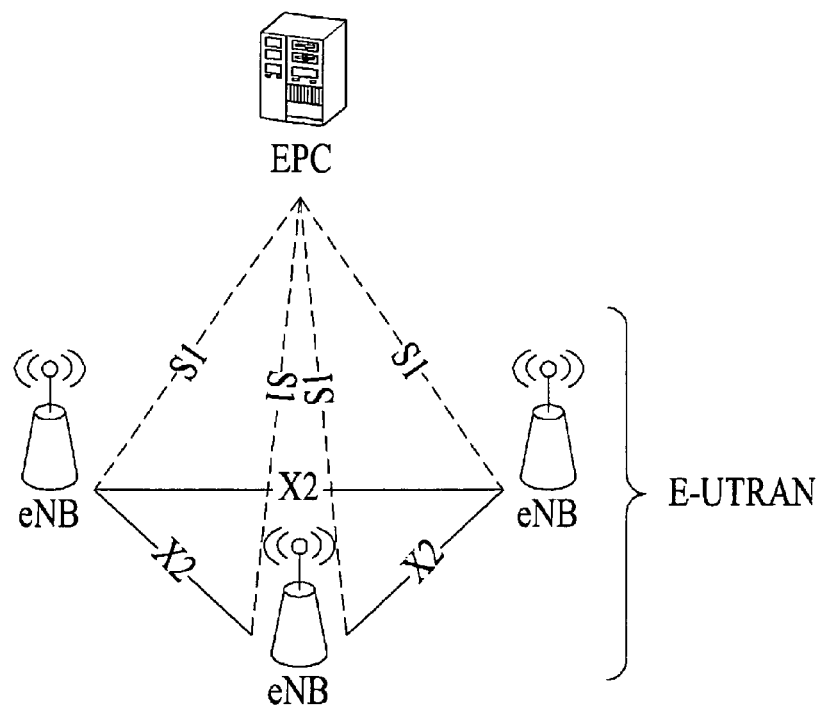
FIG. 1 illustrates a network structure of an E-UTRAN.
Figure 2:
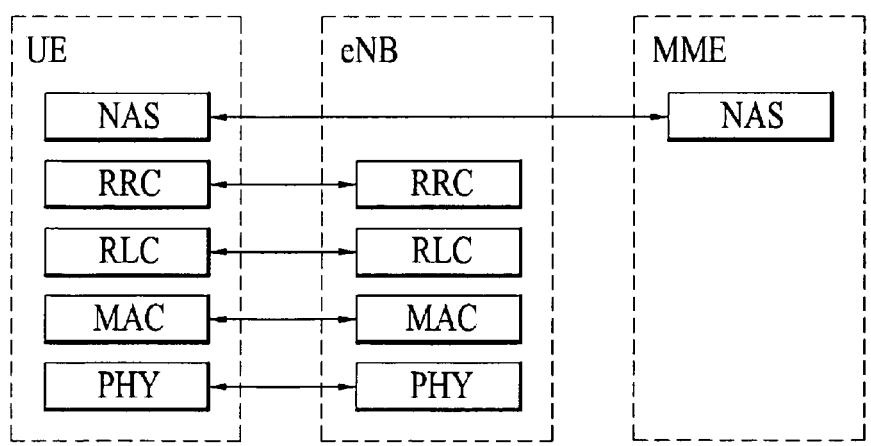
FIG. 2 illustrates a radio interface protocol structure between a UE and a UTRAN based on the 3GPP radio access network standard.
Figure 3:
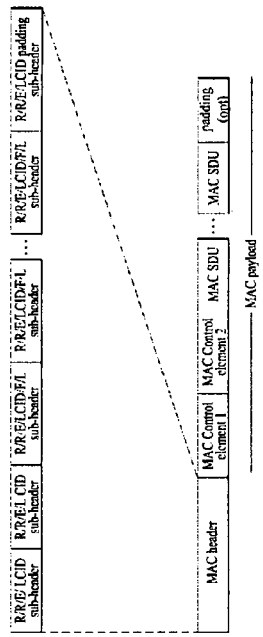
FIG. 3 illustrates an exemplary configuration of a MAC PDU in the related art.
Figure 4:
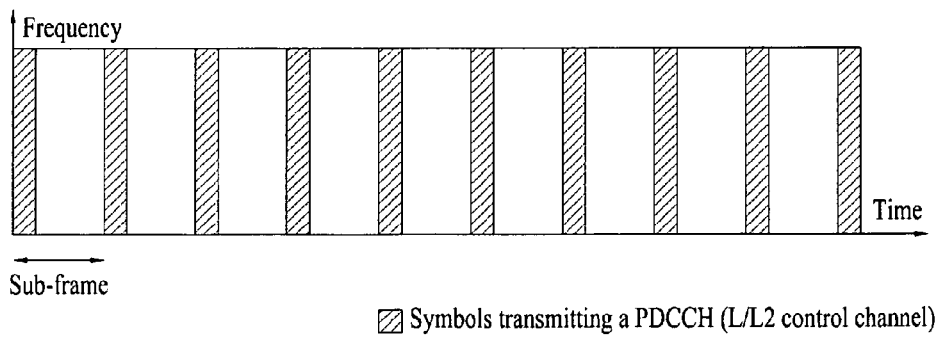
FIG. 4 illustrates conventional control channel transmission.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, although the following descriptions will be given in detail with reference to the case where the mobile communication system is a UMTS system, the following descriptions, except those specific to UMTS, may be applied to any other mobile communication system.

In some instances, known structures and devices are omitted or shown in block diagram form, focusing on important features of the structures and devices, so as not to obscure the concept of the present invention. The same reference numbers will be used throughout this specification to refer to the same or like parts.

In the following description, the term "User Equipment (UE)" is used to generally describe any mobile or stationary user device (or terminal) such as a Mobile Station (MS). In addition, the term "eNode B (eNB)" is used to generally describe any network node that communicates with the UE such as a Node B or a base station.

First, a Multimedia Broadcast/Multicast Service (MBMS) is described as follows. A Multicast Control Channel (MCCH), which is a logical channel, or a Multicast Traffic Channel (MTCH) may be mapped to a Multicast Channel (MCH) which is a transport channel for MBMS. The MCCH transmits an MBMS related Radio Resource Control (RRC) message and the MTCH transmits traffic of a specific MBMS service. One MCCH is present for each MBMS Single Frequency Network (MBSFN) region which transmits the same MBMS information and traffic and a UE may receive a plurality of MCCHs when a plurality of MBSFN regions is provided in one cell. When an MBMS related RRC message has changed in a specific MCCH, the eNB transmits an MBMS Radio Network Temporary Identity (M-RNTI) and an indicator of the specific MCCH through a Physical Downlink Control Channel (PDCCH). A UE that supports MBMS may receive the M-RNTI and the MCCH indicator and determine that the MBMS related RRC message has been changed in the specific MCCH and may then receive the specific MCCH.

In LTE, MBMS data is transmitted through MBMS-dedicated MBSFN subframes. Accordingly, data of an MCH, which is a transport channel carrying an MTCH and an MCCH that is a logical channel, is transmitted only through MBSFN subframes. The eNB sets MBSFN subframes for MBMS at regular intervals and broadcasts the setting information through system information that is transmitted through a Broadcast Channel (BCH). The eNB also specifies MBSFN subframes for a specific MBSFN region among the MBSFN subframes for MBMS. The MBSFN subframes specified for the specific MBSFN region are divided into MBSFN subframes for one or more MCHs transmitted in the MBSFN region. MBSFN subframe allocation information for the specific MBSFN region and MBSFN subframe allocation information for a specific MCH are broadcast through an MCCH mapped to the specific MBSFN region.

A plurality of MTCHs mapped to one MCH is scheduled to MBSFN subframes at regular intervals. Scheduling information of a plurality of MTCHs mapped to one MCH is broadcast to UEs through MCH Scheduling Information (MSI) which is a MAC Control Element (MAC CE). The MSI is also referred to as "MBMS Dynamic Scheduling Information (DSI)". Here, an MSI MAC CE for a specific MCH is updated at regular intervals through MBSFN subframes allocated to the specific MCH.

Figures 5, 6:
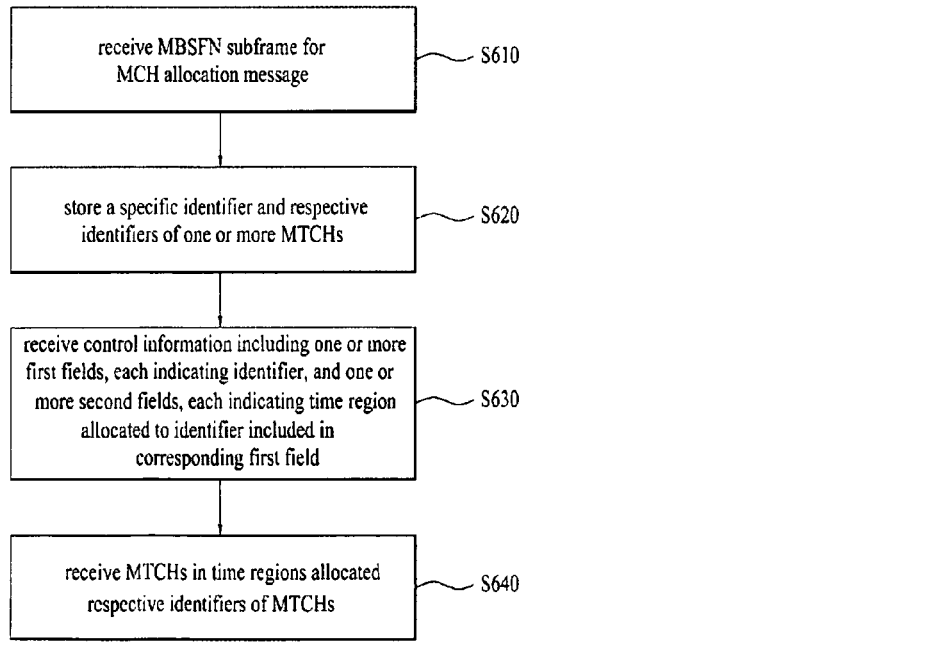
FIG. 5 illustrates an MSI MAC CE according to an embodiment of the present invention.
FIG. 6 is a flow chart illustrating a method for receiving control information according to an embodiment of the present invention.

FIG. 5 illustrates an MSI MAC CE according to an embodiment of the present invention. As shown in FIG. 5, the MSI MAC CE according to the embodiment of the present invention includes a first field indicating an identifier and a second field indicating a time region allocated to the identifier. The MSI MAC CE may include a plurality of first fields and a plurality of second fields.

Values of the first fields may be respective indicators of a plurality of MTCHs mapped to an MCH or each may be a specific identifier other than the respective identifiers of the plurality of MTCHs. The identifiers of the MTCHs may be Logical Channel Identifiers (LCIDs) of the MTCHs and the specific identifier may be a specific LCID that is additionally defined. For example, when N MTCH are multiplexed in one MCH, the wireless communication system may allocate N different LCIDs to N MTCHs and may additionally define a specific LCID.

The specific identifier may be a previously defined value and may also be a value set by the RRC of the eNB.

The specific identifier may also be an unused LCID that is not allocated to the plurality of MTCHs mapped to the MCH. In this case, the UE may determine which LCID is not used among the LCIDs of the MCH through a corresponding MCCH.

Each second field indicates a time region allocated to an identifier of a first field corresponding to the second field. In FIG. 5, if identifier 1 is an LCID of the first of the plurality of MTCHs, time region 1 indicates a time region allocated for transmission of the first MTCH. That is, the eNB transmits the first MTCH in time region 1. If identifier 2 is the specific LCID that is additionally defined, time region 2 indicates a time region in which the plurality of MTCHs mapped to the MCH is not transmitted. That is, the eNB does not transmit the plurality of MTCHs mapped to the MCH in time region 2. The eNB may transmit data other than MBMS data in time region 2.

Each second field may indicate the last MBSFN subframe of a corresponding time region. In FIG. 5, time region 1 may indicate the last MBSFN subframe of the time region in which the first MTCH is transmitted. That is, MBSFN subframes, starting from the first of the MBSFN subframes allocated to the MCH and ending with an MBSFN subframe indicated by time region 1, are scheduled to the first MTCH and MTCHs may not be transmitted through MBSFN subframes, starting from an MBSFN subframe next to the MBSFN subframe indicated by time region 1 and ending with an MBSFN subframe indicated by time region 2.

In FIG. 5, if time region 1 is "99", this indicates that the first to 99th MBSFN subframes among the MBSFN subframes allocated to the MCH are scheduled to the first MTCH. If time region 2 is "199", this indicates that no MTCH is scheduled to the 101st to 200th MBSFN subframes among the MBSFN subframes allocated to the MCH. If the identifier 3 is the LCID of the second MTCH and the time region 3 is "299", this indicates that the 201st to 300th MBSFN subframes among the MBSFN subframes allocated to the MCH are scheduled to the second MTCH.

Each second field may also indicate the number of subframes of a time region indicated by the second field.

FIG. 6 is a flow chart illustrating a method for receiving control information according to an embodiment of the present invention.

As shown in FIG. 6, a UE receives an MBSFN subframe allocation message for an MCH through an MCCH (S610).

The MBSFN subframe allocation message for the MCH includes information regarding setting of one or more MTCHs that are multiplexed and mapped to the MCH. The information regarding setting of one or more MTCHs includes a specific identifier and respective identifiers of the one or more MTCHs that are multiplexed.

The UE stores the specific identifier and the identifiers of the MTCHs acquired from the received MBSFN subframe allocation message (S620).

The UE receives the MSI MAC CE shown in FIG. 5 at regular intervals (S630).

As described above, the MSI MAC CE is control information including one or more first fields, each indicating an identifier, and one or more second fields, each indicating a time region allocated to an identifier included in a corresponding first field.

Upon receiving the MSI MAC CE including the specific identifier described above, the UE determines that no MTCH is transmitted during a time region indicated by a second field corresponding to a first field including the specific identifier. The UE may receive a non-MTCH channel during the time region indicated by the second field corresponding to the first field including the specific identifier. For example, the UE may receive a Dedicated Traffic Channel (DTCH), a Dedicated Control Channel (DCCH), or the like as the non-MTCH channel.

The UE receives the MTCHs during the time regions allocated to the respective identifiers of the MTCHs (S640).

Figure 7:
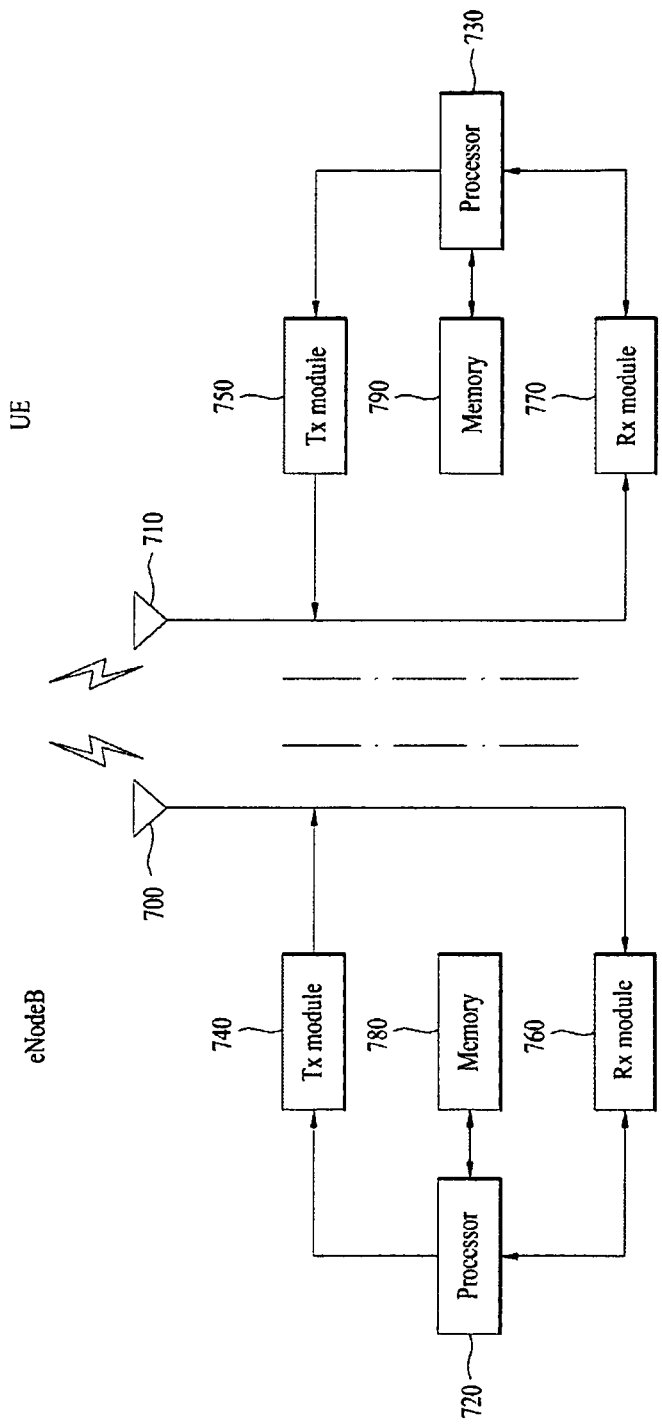
FIG. 7 illustrates respective configurations of a transmitter and a receiver in which the embodiments of the present invention can be implemented.

FIG. 7 illustrates respective configurations of an eNB and a UE according to another embodiment of the present invention, in which the embodiments of the present invention described above can be implemented.

The eNB and the UE include antennas 700 and 710 for transmitting and receiving information, data, signals, and/or messages, transmission modules 740 and 750 for transmitting messages through the antennas, reception modules 760 and 770 for receiving messages through the antennas, memories 780 and 790 for storing information associated with communication between the eNB and the UE, and processors 720 and 730 for controlling the transmission modules, reception modules, and memories, respectively.

The antennas 700 and 710 transmit signals generated by the transmission modules 740 and 750 to the outside or receive wireless signals from the outside and provide the received signals to the reception modules 760 and 770, respectively. Each of the eNB and the UE may include two or more antennas when the eNB and the UE support multiple antenna (MIMO) functionality.

The processors 720 and 730 control overall operations of the eNB and the UE, respectively. Particularly, the processors 720 and 730 may perform a control function for implementing the embodiments of the present invention, a MAC frame variable control function depending on service characteristics and radio environments, a handover function, authentication and encryption functions, and the like. Each of the processors 720 and 730 may include an encryption module for controlling encryption of various messages and a timer module for controlling transmission and reception of various messages.

The transmission modules 740 and 750 may perform coding and modulation of signals and/or data, which are scheduled to be transmitted to the outside by the processors 720 and 730, and may then provide the resulting signals and/or data to the antennas 700 and 710, respectively.

The transmission module 740 of the eNB transmits control information including one or more first fields, each indicating an identifier, and one or more second fields, each indicating a time region allocated to an identifier included in a corresponding first field.

The reception modules 760 and 770 may perform decoding and demodulation of wireless signals received from the outside through the antennas 700 and 710 and may then provide resulting original data to the processors 720 and 730, respectively.

The reception module 770 of the UE receives, from the eNB, control information including one or more first fields, each indicating an identifier, and one or more second fields, each indicating a time region allocated to an identifier included in a corresponding first field.

The memories 780 and 790 may store programs for implementing processing and control by the processors 720 and 730 and may temporarily store input/output data, respectively. Examples of the input/output data include an uplink grant that the eNB allocates to the UE, system information, a station identifier (STID), a flow identifier FID, an action time, region allocation information, frame offset information, and the like.

The memory may include a storage medium of at least one of a flash memory type, a hard disk type, a multimedia card micro type, a card type (for example, SD or XD memory), Random Access Memory (RAM) Static Random Access Memory (SRAM), Read-Only Memory (ROM), Electrically Erasable Programmable Read-Only Memory (EEPROM), Programmable Read-Only Memory (PROM), a magnetic memory, a magnetic disc, and an optical disc.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may combine the structures described in the above embodiments in a variety of ways.

Accordingly, the invention should not be limited to the specific embodiments described herein, but should be accorded the broadest scope consistent with the principles and novel features disclosed herein.

The invention claimed is:

1. A method for receiving control information of a plurality of multiplexed channels by a User Equipment (UE) in a wireless communication system, the method comprising:
   receiving first control information including a first field and a second field,
   wherein the first field indicates a first identifier identifying the plurality of multiplexed channels or a second identifier not allocated to the plurality of multiplexed channels,
   wherein the second field indicates information on a time interval allocated to the first identifier or the second identifier,
   wherein when the first field indicates the first identifier, and the plurality of multiplexed channels are transmitted during the time interval based on the second field, and
   wherein when the first field indicates the second identifier, the plurality of multiplexed channels are not transmitted during the time interval based on the second field.

2. The method according to claim 1, further comprising:
   receiving a channel other than the plurality of multiplexed channels from the base station during the time interval, when the first field indicates the second identifier.

3. The method according to claim 2, wherein the channel other than the plurality of multiplexed channels is a Dedicated Traffic Channel (DTCH) or a Dedicated Control Channel (DCCH).

4. The method according to claim 1, wherein the information on the time interval indicates a last time point of the time interval.

5. The method according to claim 1, further comprising:
receiving second control information including information on first identifier and second identifier from a base station.

6. The method according to claim 1, wherein the plurality of multiplexed channels includes Multicast Traffic Channels (MTCHs) which are multiplexed into one multicast channel.

7. The method according to claim 1, wherein the second identifier is a value that is not used among values of channel identifier fields for channel identifiers identifying the plurality of multiplexed channels.

8. A method for transmitting control information of a plurality of multiplexed channels by a base station in a wireless communication system, the method comprising:
transmitting first control information including a first field and a second field,
wherein the first field indicates a first identifier identifying the plurality of multiplexed channels or a second identifier not allocated to the plurality of multiplexed channels,
wherein the second field indicates information on a time interval allocated to the first identifier or the second identifier,
wherein when the first field indicates the first identifier, the plurality of multiplexed channels are transmitted during the time interval based on the second field, and
wherein when the first field indicates the second identifier, the plurality of multiplexed channels are not transmitted during the time interval based on the second field.

9. The method according to claim 8, further comprising:
transmitting a channel other than the plurality of multiplexed channels during the time interval, when the first field indicates the second identifier.

10. The method according to claim 9, wherein the channel other than the plurality of multiplexed channels is a Dedicated Traffic Channel (DTCH) or a Dedicated Control Channel (DCCH).

11. The method according to claim 8, wherein the information on the time interval indicates a last time point of the time interval.

12. The method according to claim 9, further comprising:
transmitting second control information including information on the first identifier and the second identifier.

13. The method according to claim 8, wherein the plurality of multiplexed channels includes Multicast Traffic Channels (MTCHs) which are multiplexed into one multicast channel.

\* \* \* \* \*

UNITED STATES PATENT AND TRADEMARK OFFICE
CERTIFICATE OF CORRECTION

| | | |
|---|---|---|
| PATENT NO. | : 8,897,196 B2 | Page 1 of 1 |
| APPLICATION NO. | : 13/511088 | |
| DATED | : November 25, 2014 | |
| INVENTOR(S) | : Young Dae Lee et al. | |

It is certified that error appears in the above-identified patent and that said Letters Patent is hereby corrected as shown below:

ON THE TITLE PAGE:

Item (60) insert the following:

-- Related U.S. Application Data

Provisional application No. 61/293,185, filed on Jan. 7, 2010. --

Signed and Sealed this

Thirty-first Day of March, 2015

Michelle K. Lee
*Director of the United States Patent and Trademark Office*